US006843834B2

(12) United States Patent  
Schumacher

(10) Patent No.: US 6,843,834 B2  
(45) Date of Patent: Jan. 18, 2005

(54) SELF-RENEWING AIR FILTER

(76) Inventor: Jerry H. Schumacher, 289 Ambling Way, Apt. No. 111, Boone, NC (US) 28607

( * ) Notice: Subject to any disclaimer, the term of this patent is extended or adjusted under 35 U.S.C. 154(b) by 88 days.

(21) Appl. No.: 10/337,121

(22) Filed: Jan. 6, 2003

(65) Prior Publication Data

US 2004/0129139 A1 Jul. 8, 2004

(51) Int. Cl.[7] .............................................. B01D 46/18
(52) U.S. Cl. ..................... 95/277; 95/1; 95/19; 55/351; 55/352; 55/354; 55/422; 96/423
(58) Field of Search ................................. 95/1, 19, 277; 96/423, 429; 55/351, 352, 354, 422

(56) References Cited

U.S. PATENT DOCUMENTS

| | | | | |
|---|---|---|---|---|
| 4,054,521 A | * | 10/1977 | Winzen ........................ | 55/352 |
| 4,221,576 A | * | 9/1980 | Phillips, Jr. .................. | 55/352 |
| 4,470,833 A | * | 9/1984 | Wolfe .......................... | 96/429 |
| 4,627,863 A | * | 12/1986 | Klein .......................... | 55/354 |
| 6,152,998 A | * | 11/2000 | Taylor ......................... | 96/429 |
| 6,168,646 B1 | * | 1/2001 | Craig et al. .................. | 96/423 |
| 6,402,822 B1 | * | 6/2002 | Najm .......................... | 96/429 |
| 6,596,059 B1 | * | 7/2003 | Greist et al. ................. | 55/354 |
| 6,632,269 B1 | * | 10/2003 | Najm .......................... | 95/273 |

* cited by examiner

Primary Examiner—Duane Smith  
Assistant Examiner—Jason M. Greene  
(74) Attorney, Agent, or Firm—Sturm & Fix LLP

(57) ABSTRACT

The replacement of filters for Heating, Ventilating, and Air Conditioning (HVAC) is often time-consuming and labor-intensive. Organizations having responsibility for many apartment or dormitory units can spend a significant fraction of their man-hours replacing such filters. A novel approach to reducing the labor for this task is to attach one end of sheet-type filtering material to a dispensing roll, and the other end to a gathering roll; both rolls being affixed to a frame. The assembly is installed into an air duct and the filtering material allowed to blouse, somewhat. The flow of air is intermittent in typical HVAC systems, so when the air begins to flow, the filtering material is forced, due to its resistance to flow, in the direction of the flow. This energy—a force applied through a distance—is utilized by a lever arm bracket to advance the gathering roll. In this fashion, new material leaves the dispensing roll and is exposed to the air, while the dirty filter sheet accumulates on the gathering roll. The process is self-regulating because dirty filter material will present a greater resistance to flow and will, therefore, travel through a greater distance, advancing the gathering roll more.

20 Claims, 7 Drawing Sheets

SELF-RENEWING AIR FILTER

BACKGROUND OF THE INVENTION

1. Field of the Invention

The present invention relates generally to air filtration. More particularly the present invention relates to a method and apparatus for an air filter that renews itself automatically, greatly reducing the time required for replacement.

2. Background Art

Filters for furnaces and air conditioning equipment are typically rigid, framed units (for residential and commercial applications) or in the form of sheets that are stretched between rolls on either side of an air duct (for commercial and industrial applications). Rigid, framed filters are time consuming to replace. As for the sheet-type filters used in commercial and industrial applications, one of the rolls (on one side of the air duct) is drivable. It may use a stepper motor or may be hand-cranked. In the former case, there is significant expense associated with an automatically controlled filter. In the latter, although some manpower is conserved, the filters still need regular attention.

The timing for replacing or renewing filters is important. Dirty filters result in less flow rate of air which translates to less heat exchange in the HVAC equipment. The equipment must run longer to accomplish the intended goal, and air conditioning equipment may freeze up due to inadequate heat exchange.

There is, therefore, a need for a method and apparatus for providing for a self-renewing air filter for HVAC applications. There is a further need for a self-renewing air filter that renews on demand, that is, when it has become sufficiently dirty to restrict air flow.

SUMMARY OF THE INVENTION

A purpose of this invention is to provide a method and apparatus for providing filtering in air-handling units in Heating, Ventilating, and Air Conditioning (HVAC) equipment that renews itself (without human intervention) and does so as it becomes dirtied. An additional purpose of this invention is to provide the same filtering for other filtering needs such as paint booths; engine air filters for gas turbines, diesel and gasoline engines; and cabin air in automobiles.

When a sheet of filter material is stretched between rolls within an air passageway, it represents resistance to the flow of the air. A clean air filter will present less resistance than a dirty filter. Resistance to flow reveals itself as normal and shearing stresses. A dirtier filter will present greater stresses than a cleaner filter. Because of the stresses, there is a resultant force on the filter material, causing it to "billow" in the direction of the air flow. The initial movement occurring when air flow begins is used, in the present invention, to advance the "gathering roll," exposing some clean filter to the flow. More resistance, due to a dirtier air filter, results in greater advancement, which exposes a larger amount of clean air filter off the dispensing roll.

To effect the transfer of force from the air filtering sheet to the gathering roll, a lever arm bracket is constructed to lie across the middle of the exposed filter sheet in the airway. Arms pivoting on the gathering roll extend from the middle of the exposed filter sheet nearly to the drive wheel. A drive dog, engaging a gear on the drive wheel, is pivotally attached to an L-arm adjustably attached to the lever arm bracket such that the drive dog turns the gear (and drive roll) every time the filter sheet billows adequately on startup of the air flow. When the air ceases to flow, the filter sheet relaxes, and with it, the lever arm bracket. This sets the drive dog into a new gear tooth, readying it for the next cycle. The dispensing roll must resist turning, or be driven simultaneously with the gathering roll.

There is adequate swing available to the lever arm bracket so that it can advance the gathering roll's drive gear multiple gear teeth if the resistance to flow is sufficiently great (i.e. if the filter is sufficiently dirty). If the filter is not particularly dirty, it may not advance at all, or perhaps only one gear tooth. In this way, this invention is self-regulating. The greater the need for clean filter material, the greater amount of clean filter material is exposed with each cycle.

It is possible to arrange the filter sheet so it is stretched between the gathering roll and the dispensing roll. However, it has been found useful to have these two rolls at the same end of a frame, while the other end of the frame has a stationary or rotating rod around which the filter sheet wraps. Thus, the filter sheet extends from the gathering roll, across the airway, around the stationary or rotating rod and back across the airway to the dispensing roll, which is in the same vicinity as the gathering roll. This provides two layers of filter material across the airway.

The dispensing roll must be restricted from turning freely. This can be accomplished using friction, applied to the roll itself, or to the filter sheet wound around the dispensing roll. It is also possible to drive the dispensing roll in the same manner as the gathering roll.

The novel features which are believed to be characteristic of this invention, both as to its organization and method of operation together with further objectives and advantages thereto, will be better understood from the following description considered in connection with the accompanying drawings in which a presently preferred embodiment of the invention is illustrated by way of example. It is to be expressly understood however, that the drawings are for the purpose of illustration and description only and not intended as a definition of the limits of the invention.

BEST MODE FOR CARRYING OUT THE INVENTION

Figure 1:
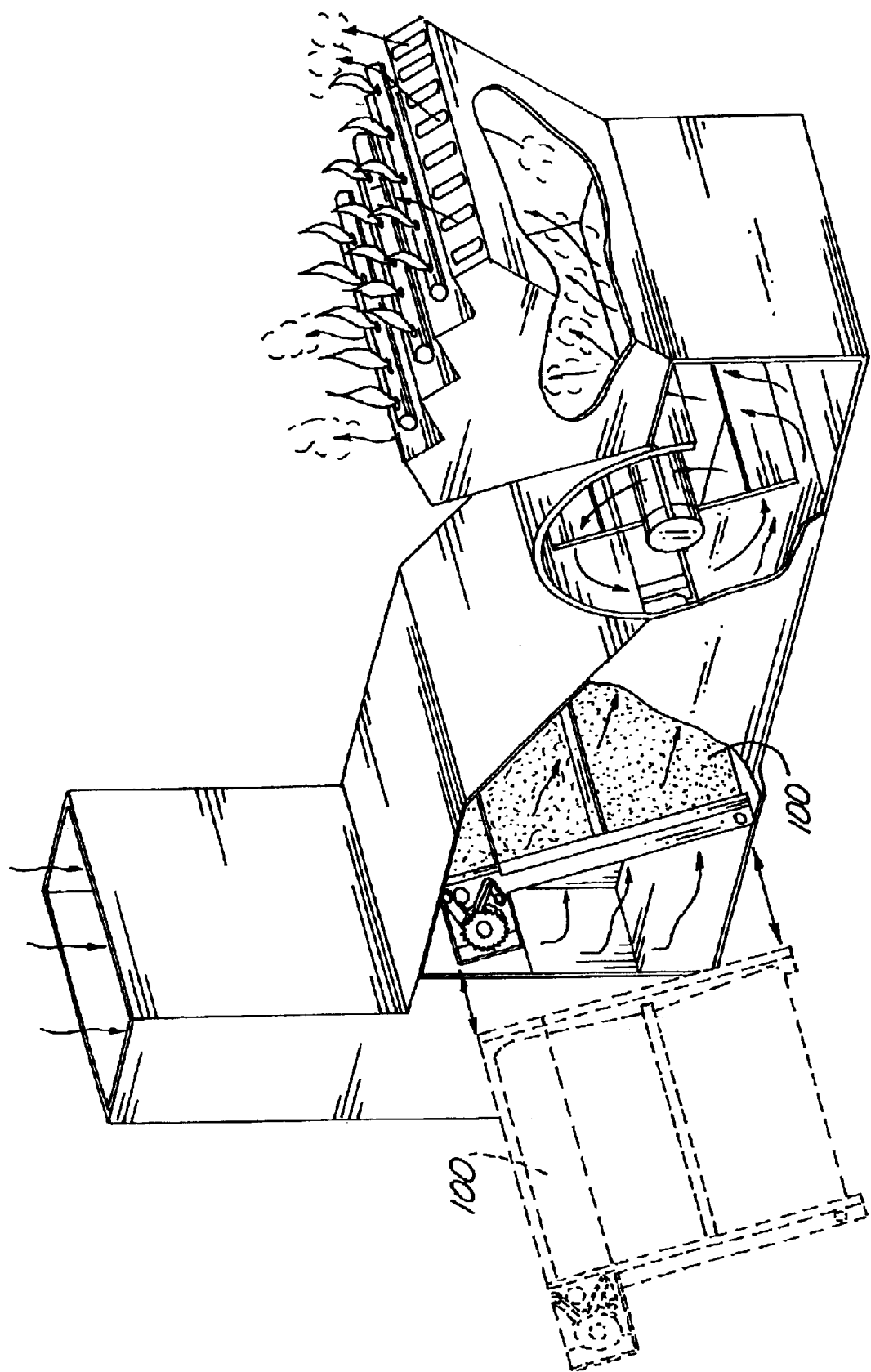
FIG. 1 shows a perspective view of a self-renewing air filter assembly inside an air passageway for a furnace with portions cut away to show details.

A self-renewing air filter assembly 100 is shown in place inside a furnace duct in FIG. 1. The same self-renewing air filter assembly 100 is shown in dashed lines to indicate how it is installed into the duct. According to the preferred embodiment, the self-renewing filter assembly 100 is oriented at an angle compared to the vertical, however, this invention is not limited to that orientation.

Figure 2:
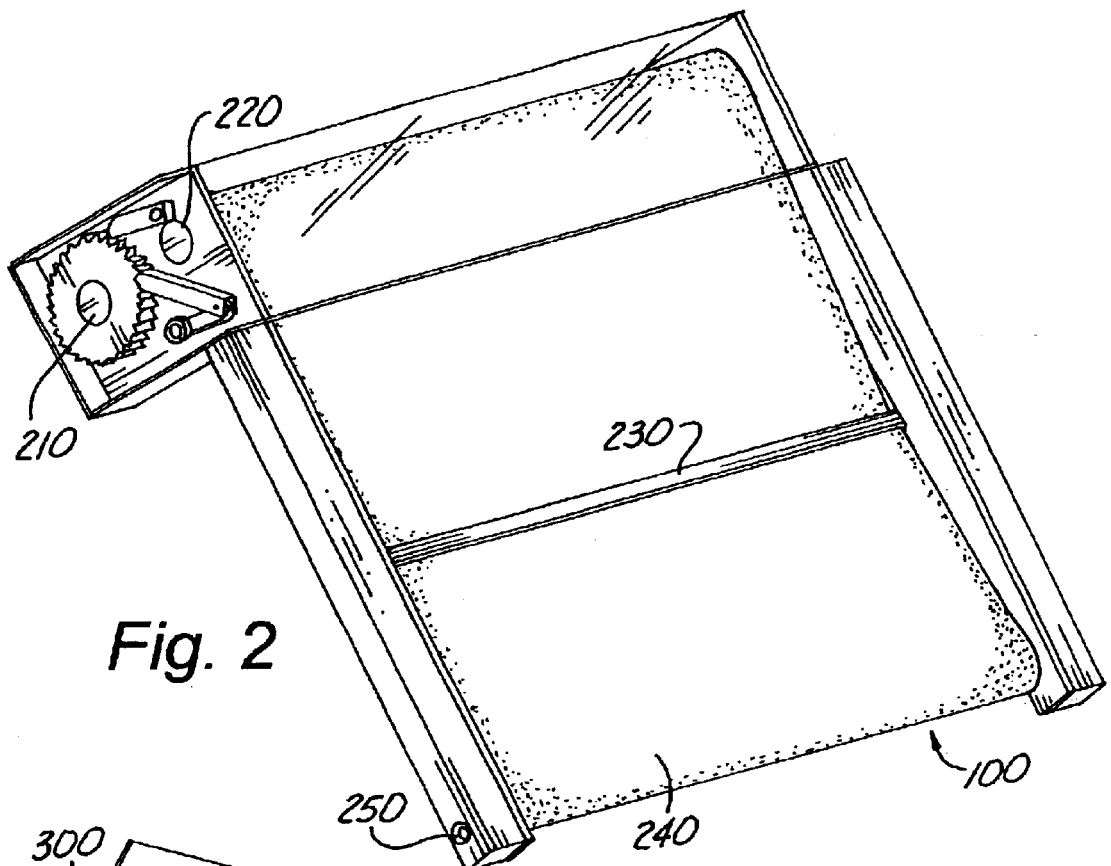
FIG. 2 shows a first perspective view of a self-renewing air filter assembly.

Another view of the self-renewing air filter assembly 100 is shown in FIG. 2. The end of the gathering roll 210 and the end of the dispensing roll 220 can be seen. The lever arm bracket 230 pivots on the gathering roll and lies on the sheet-type filtering material 240. In the preferred embodiment for HVAC applications, the gathering roll 210 and dispensing roll 220 are at one end of the self-renewing air filter assembly 100, and the filter sheet 240 wraps around a bar 250 (the end of which can be seen in FIG. 2) at the other end of the self-renewing air filter assembly 100. For automotive applications, the preferred embodiment would have the gathering roll 210 and dispensing roll 220 at opposite ends of the assembly (see FIG. 8), so the filter exposed to the airflow is a single thickness.

Figure 3:
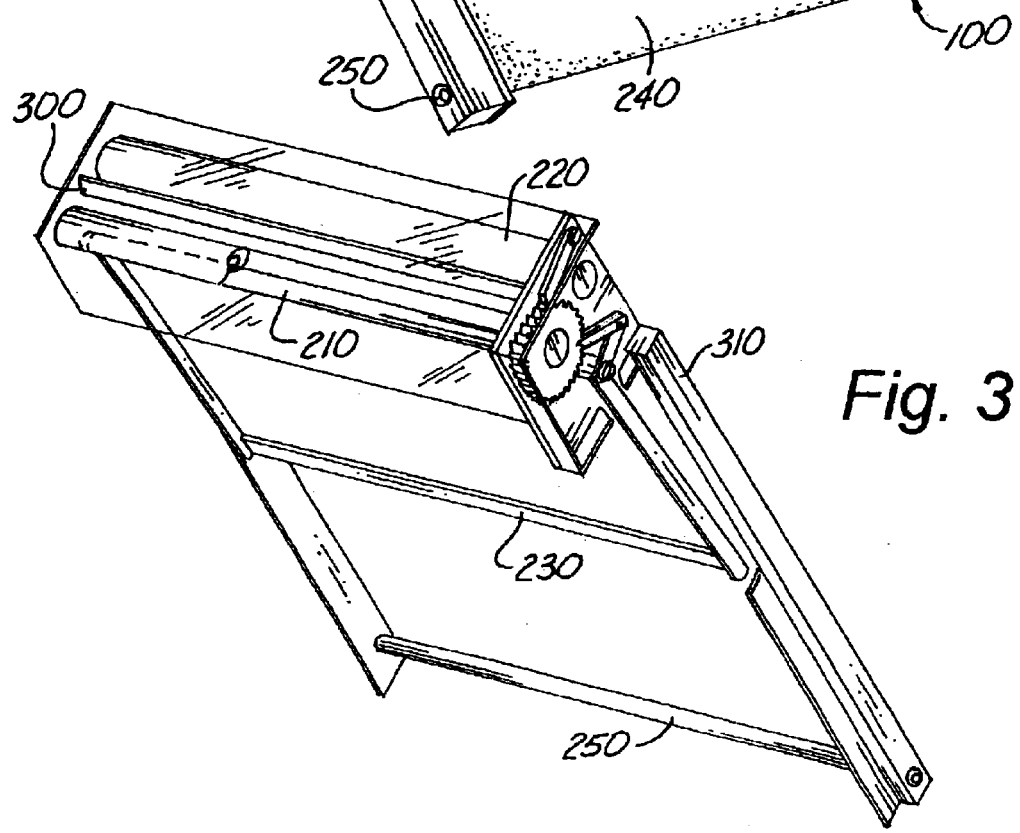
FIG. 3 shows a second perspective view of a self-renewing air filter assembly with the filter material removed.

In FIG. 3, the self-renewing air filter assembly 100 is shown without the filter sheet 240. The gathering roll 210, the dispensing roll 220, and the bar 250 over which the filter sheet 240 wraps, can be clearly seen in this view. A more complete illustration of the lever arm bracket 230 is also apparent. A braking bar 300 is installed between the gathering roll 210 and the dispensing roll 220. Its purpose is to provide requisite friction to the dispensing roll so the filter sheet 240 does not unroll prematurely. The braking bar 300 is installed in the frame 310 of the self-renewing air filter assembly 100 such that it can rotate slightly on its ends as the filter sheet 240 trades rolls.

Figure 4:
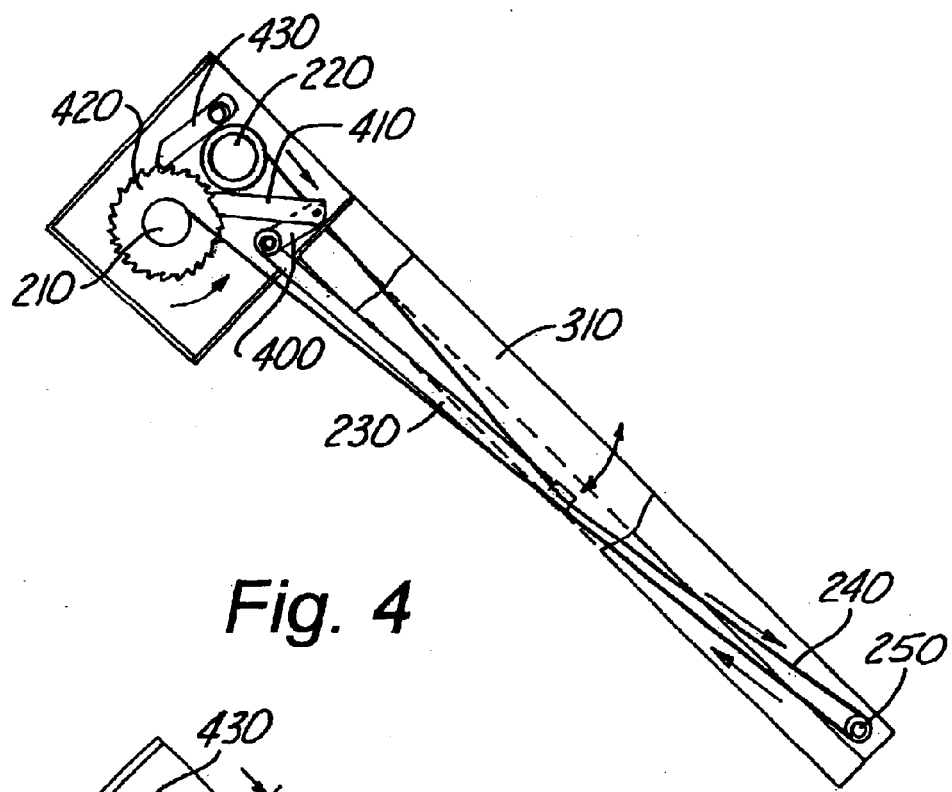
FIG. 4 shows a side elevational view of a self-renewing air filter assembly with the filter sheet in a relaxed position, with a filter sheet bloused downward.

FIG. 4 shows the self-renewing air filter assembly 100 from the side. The filter sheet 240 is in a relaxed position, as when no air is flowing through it. An L-arm 400 is adjustably attached to the lever arm bracket 230. By loosening a fastener, the angle at which the L-arm 400 makes with respect to the lever arm bracket 230 can be altered to suit various levels of filter sheet 240 blousing. A drive dog 410 is pivotally attached to the L-arm 400 and engages a drive gear 420 affixed to the end of the gathering roll 210. Placing the unit at an angle, as shown, results in greater filter area than if the unit was placed vertically. An additional benefit is the lever arm bracket 230 rests naturally on the filter material due to gravity, and a measurable force is required to lift the lever arm bracket.

Figure 5:
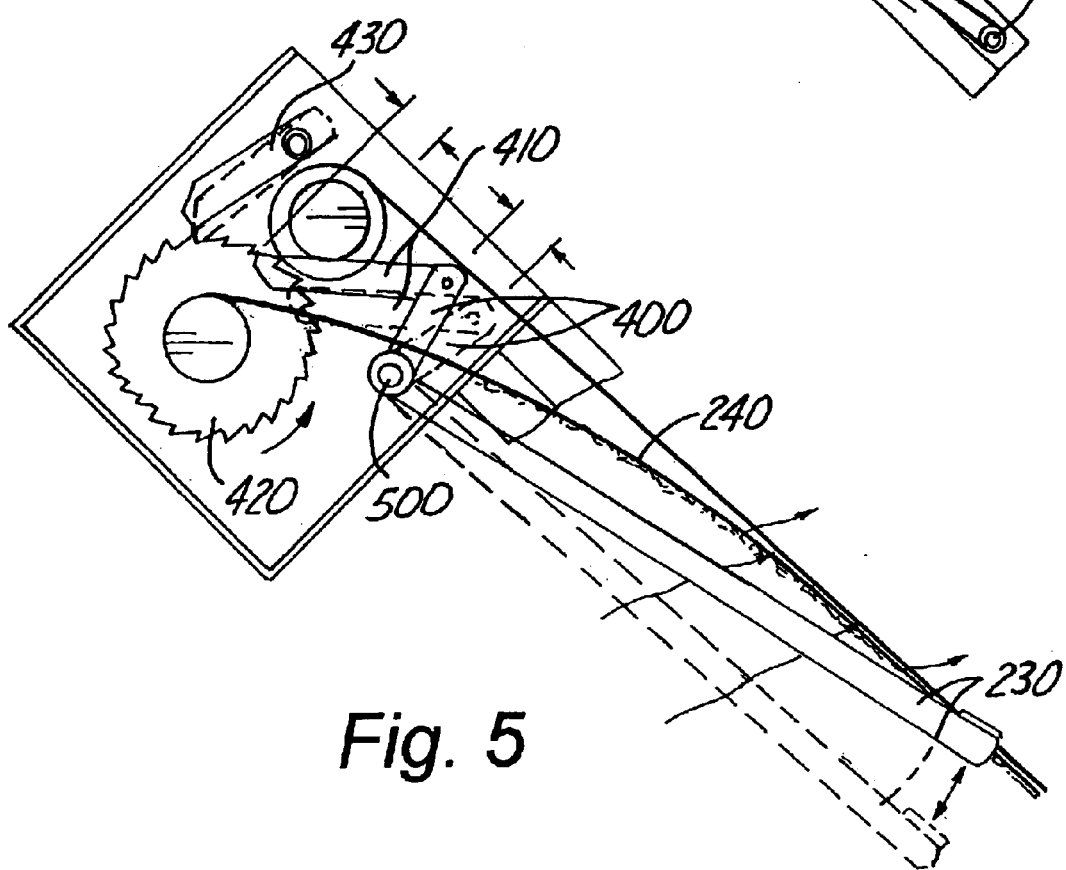
FIG. 5 shows an enlarged side elevational view of a self-renewing air filter assembly with the filter sheet in a flexed position, billowing in the direction of the fluid flow.

When air flows, it encounters resistance from the filter sheet 240. This resistance results in a force on the filter sheet 240 in the direction of the flow (left to right in FIG. 4). The flow of air is intermittent, because the controls for the HVAC turn a fan on or off based on the need for heat or cooling. Due to a modest amount of blousing, the filter sheet 240 tends to accelerate in the direction of the flow when the flow begins because of the force of the air on the filter sheet 240. If the resistance to flow is sufficient, the billowing of the filter sheet 240 in the direction of the flow will cause the lever arm bracket 230 to be displaced in the direction of the flow as seen in FIG. 5. Because the lever arm bracket 230 is pivotally attached to the frame 310, the lever arm bracket 230 will rotate about its pivot point 500 as it is displaced in the direction of flow. The pivoting will cause the drive dog 410 to advance the drive gear 420 an amount related to the lever arm bracket's 230 displacement. Advancing the drive gear 420 causes rotation of the gathering roll 210, which draws the filter sheet 240 off the dispensing roll 220 and brings fresh filter in contact with the air flow. A stop dog 430 holds the drive gear 420 stationary when the lever arm bracket 230 relaxes when air flow ceases. When the lever arm bracket 230 relaxes, the drive dog 410 engages a new tooth in the drive gear 420, ready to advance the gathering roll 210 upon startup of the airflow.

Figure 6:
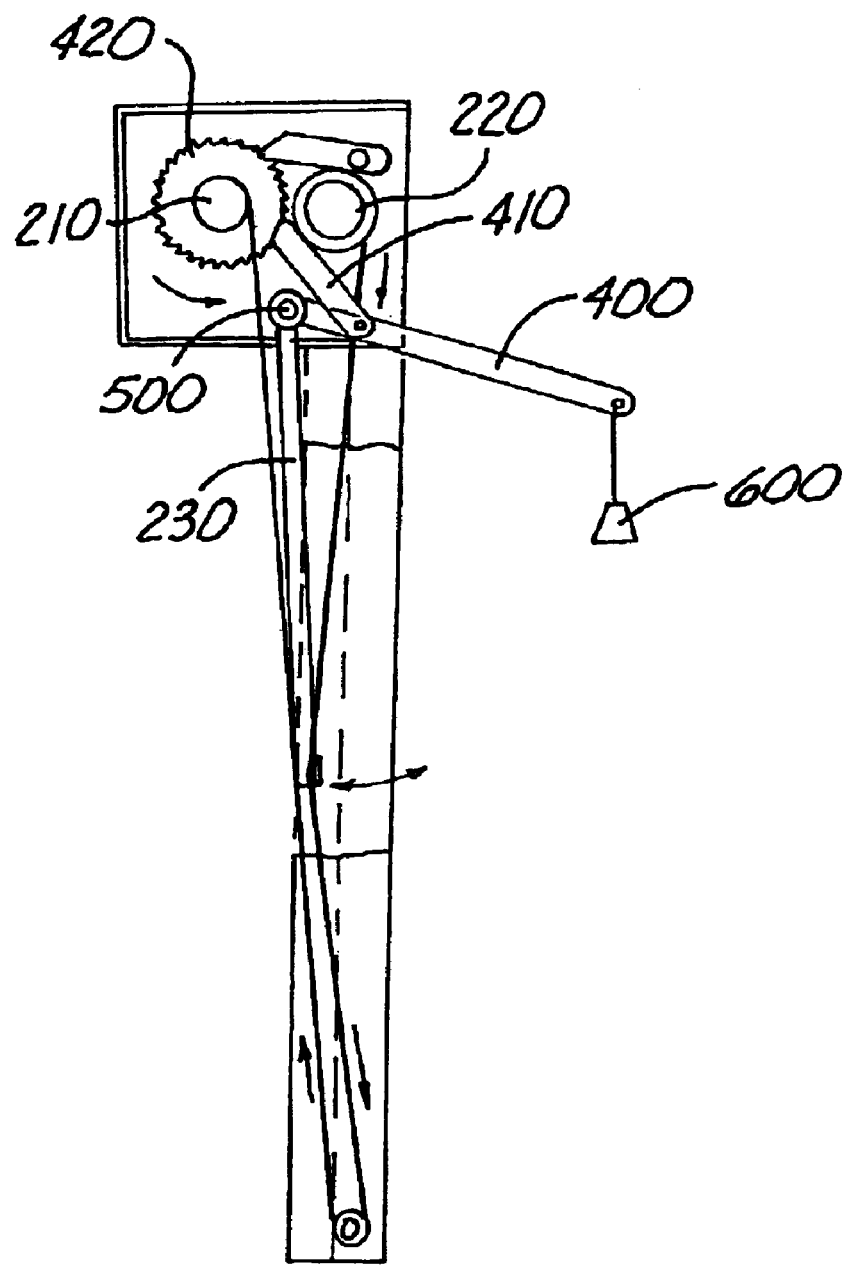
FIG. 6 shows a side view of a self-renewing air filter assembly in a vertical operating position and an extra weight required for operation.

In instances where a vertical positioning is required, a counterweight 600, as shown in FIG. 6, suspended from an extended L-arm 400 provides a force that positions the lever arm bracket 230 into the filter sheet 240.

Figure 7:
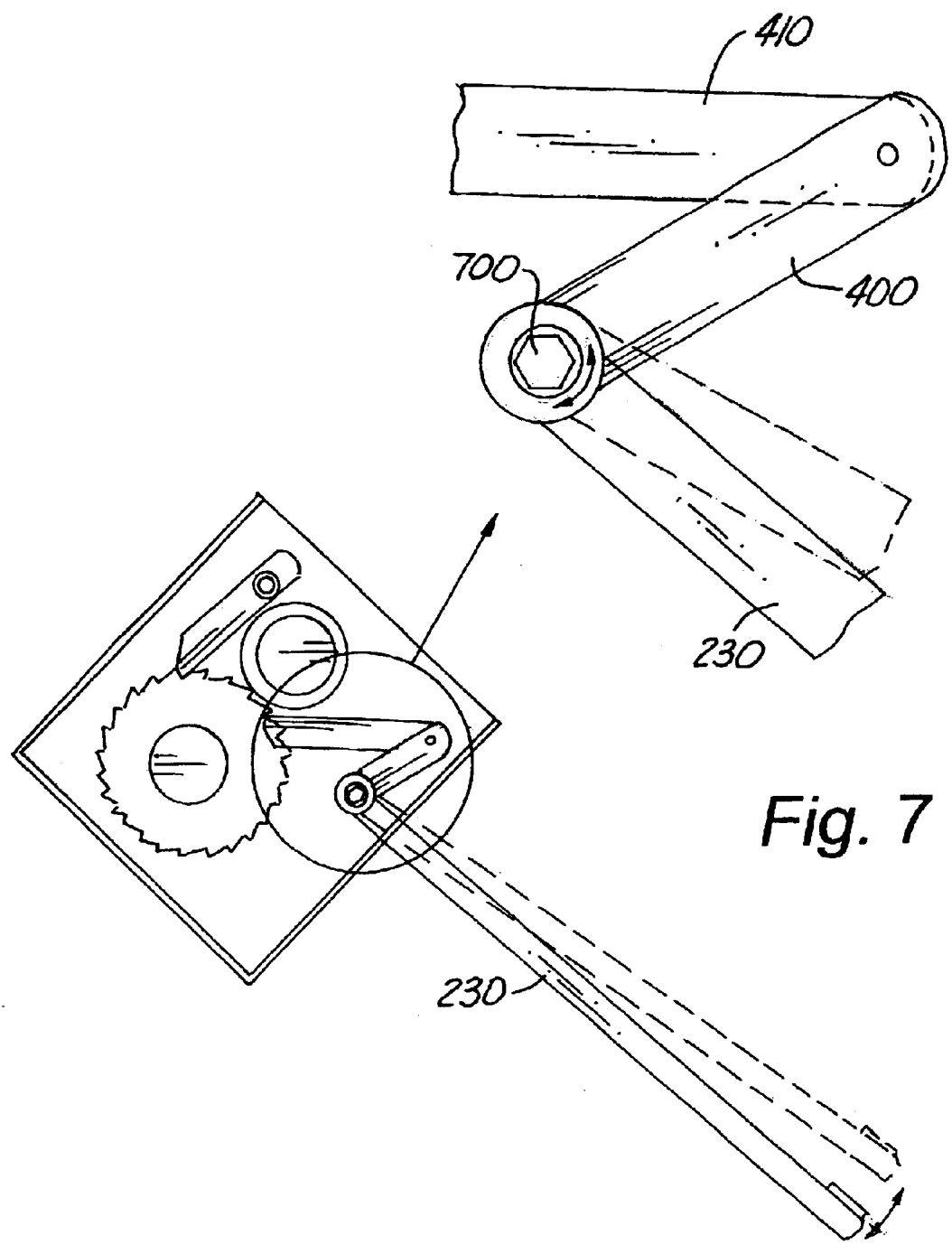
FIG. 7 shows a detail of an adjustable connection between a lever arm bracket and an L-arm.

A detailed illustration of the adjustment for the angle of the L-arm 400 relative to the lever arm bracket 230 is shown in FIG. 7. Loosening a bolt or nut 700 permits the adjustment of the angle, while tightening the same threaded fastener causes the L-arm 400 and the lever arm bracket 230 to operate as one unit. If a faster rate of travel for the filter sheet 240 is desired, the filter sheet 240 is bloused to a greater extent and the angle between the L-arm 400 and the lever arm bracket 230 increased accordingly. When the air begins to flow, the greater blousing of the filter sheet 240 results in a larger angular displacement of the lever arm bracket 230. This greater angular displacement of the lever arm bracket 230 translates into more rotation of the gathering roll 210.

Figure 8:
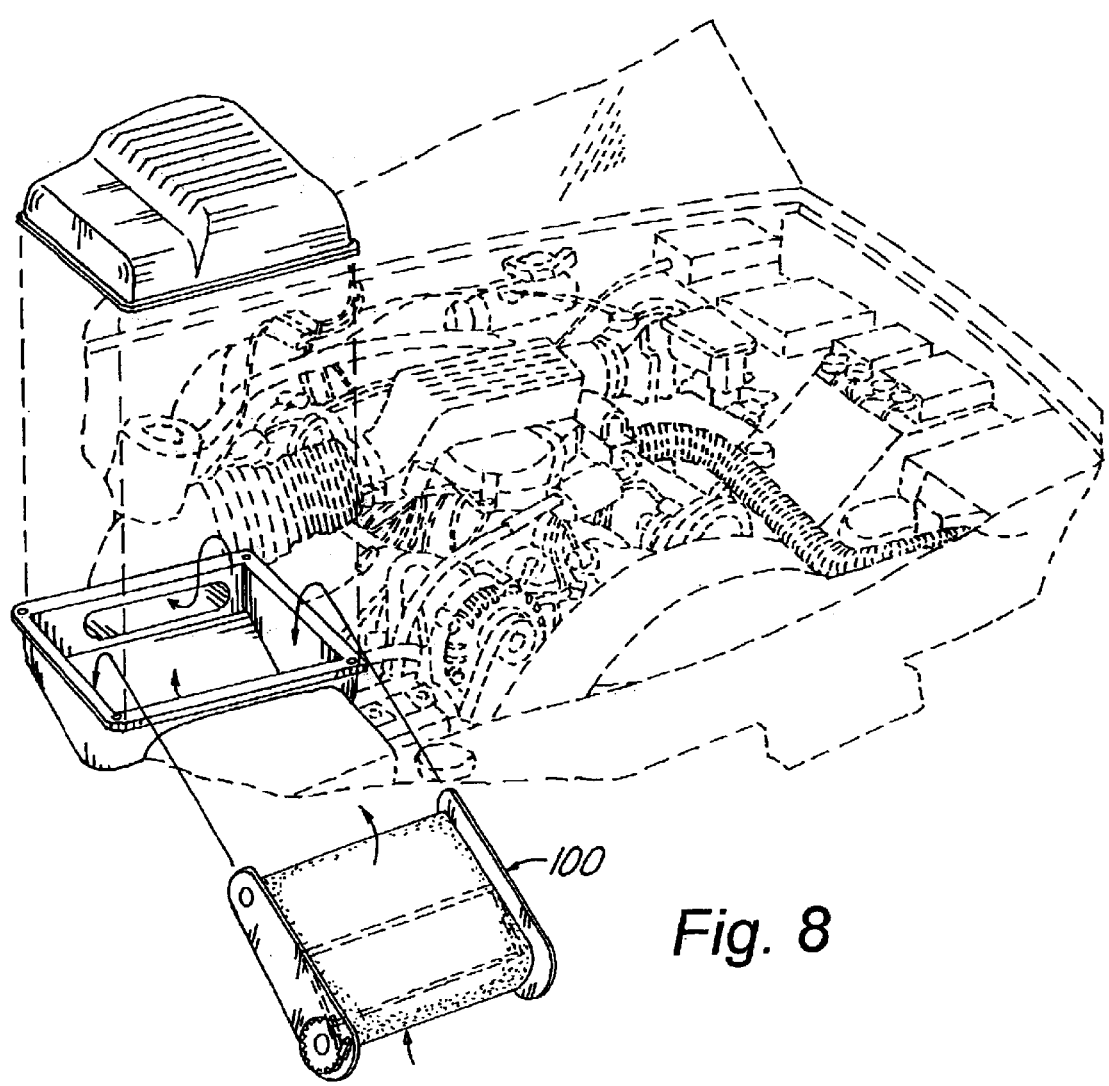
FIG. 8 shows a perspective, exploded view of a self renewing air filter assembly used in an automotive application.

In FIG. 8, a self-renewing air filter assembly 100 is depicted in automotive use as an engine air filter. Each time the engine is started, the filter sheet 240 billows, forcing the lever arm bracket 240 to rotate about its pivot point and, ultimately, drive the gathering roll. A clean air filter is a necessary element to a well-maintained engine.

Figure 9:
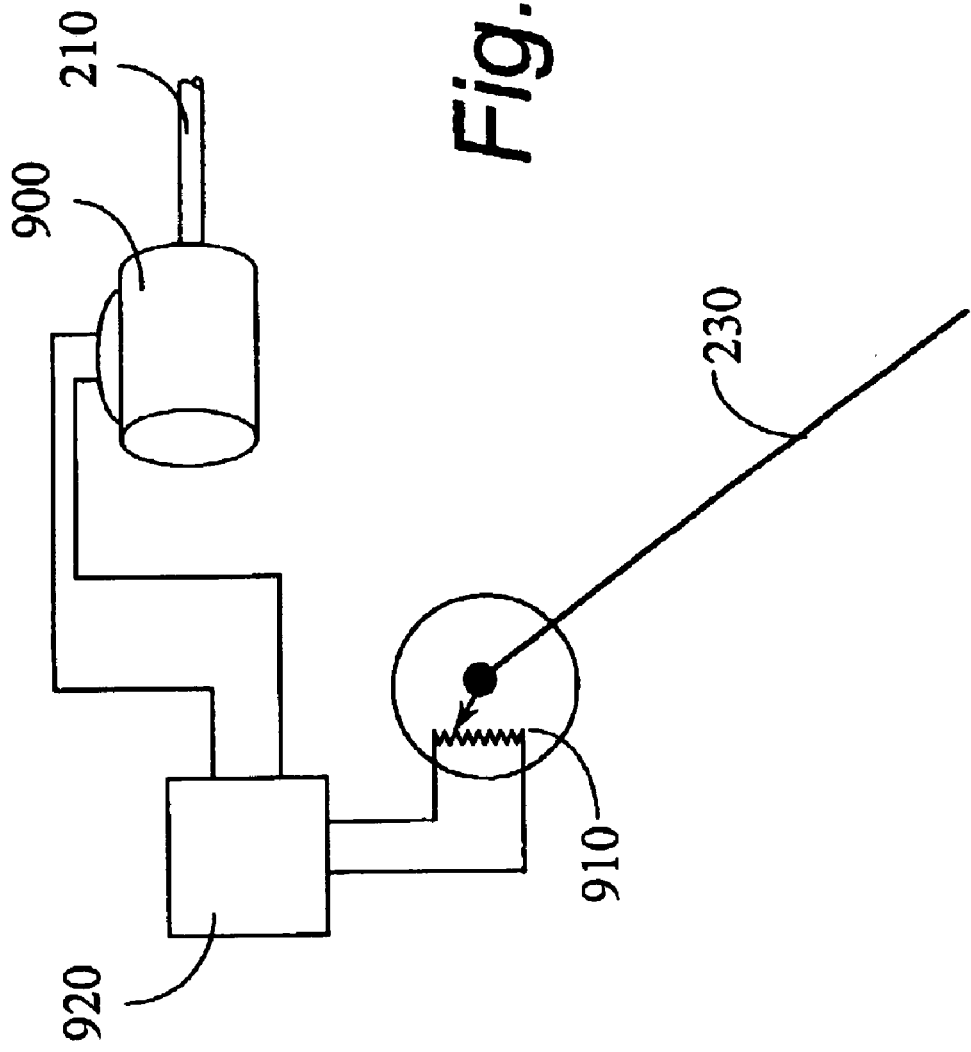
FIG. 9 shows a schematic of an additional embodiment of the present invention, using a motor to drive a gathering roll.

An additional embodiment of the present invention is shown in FIG. 9. The filter assembly is the same as already disclosed in the previously mentioned figures, except that a motor 900 is used to drive the gathering roll 210. The lever arm bracket 230 is installed as before, but drives a variable electrical device 910 indicating the degree of rotation. Such an electrical device may be a rheostat, potentiometer, or a piezoelectric or piezoresistive device. The change in electrical properties (such as resistance or voltage) is a function of the degree of rotation of the lever arm bracket 230, and is detected by a motor controller 920, which is electrically connected to the variable electrical device 910. The motor controller 920, in turn, is electrically connected to the motor 920, the shaft of which drives (directly or indirectly) the gathering roll 210.

Some of the possible applications for the present invention are: air filters for heating, ventilating, and air conditioning; paint booths; engine air filters for gas turbines, diesel and gasoline engines; and cabin air in automobiles. Other applications are conceivable, and are not limited to air filtration. Any fluid (liquid or gas) may be filtered in this fashion.

The above embodiment is the preferred embodiment, but this invention is not limited thereto. The illustrations show a fixture with both the gathering and dispensing rolls on the same end of the frame. This invention is not limited to this configuration. Acceptable orientations are not restricted to those illustrated. It has, therefore, been made obvious that many modifications and variations of the present invention are possible in light of the above teachings. It is, therefore, to be understood that within the scope of the appended claims, the invention may be practiced otherwise than as specifically described.

I claim:

1. A method for renewing a sheet-type filtering material in an intermittently flowing fluid inside a conduit, said intermittent flow applying a force to the sheet-type filtering material and causing a movement of the sheet-type filtering material, said method comprising:

(a) attaching one end of the sheet-type filtering material to a gathering roll;

(b) stretching the sheet-type filtering material across the conduit such that the filtering material blouses; and (c) transferring the force and movement of the sheet-type filtering material, in the direction of fluid flow, to the gathering roll to turn the gathering roll thereby advancing the sheet-type filtering material such that clean filtering material is exposed to the fluid flow.

2. The method of claim 1 wherein a lever arm bracket converts a linear movement of the sheet-type filtering material to a rotation of the lever arm bracket about an axis.

3. The method of claim 2 wherein the rotation is used to advance the gathering roll.

4. The method of claim 2 comprising the additional steps:

(a) adjustably attaching an L-arm to the lever arm bracket;

(b) pivotally attaching a drive dog to the L-arm; and (c) with the drive dog, engaging a gear affixed to the gathering roll, thereby transferring force from the sheet-type filtering material to the gear, causing the gear to rotate.

5. The method of claim 1 wherein a second end of the sheet-type filtering material is attached to a dispensing roll.

6. The method of claim 5 wherein a turning of the dispensing roll is restricted by friction.

7. The method of claim 6 wherein the friction is applied to an outer surface of a roll of the sheet-type filter material wound on the dispensing roll.

8. The method of claim 4 wherein the step of adjustably attaching an L-arm to the lever arm bracket is effected by attaching the L-arm to the lever arm bracket with a threaded fastener.

9. A method for renewing a sheet-type filtering material in an intermittently flowing fluid inside a conduit comprising:

(a) attaching one end of the sheet-type filtering material to a gathering roll;

(b) stretching the sheet-type filtering material across the conduit such that the filtering material blouses; and (c) sensing an extent of a movement of the sheet-type filtering material due to the intermittent flow, in the direction of fluid flow; and (d) causing a rotation of a motor shaft driving the gathering roll, the amount of rotation being based on the sensed extent of the movement of the sheet-type filtering material.

10. An apparatus for renewing a sheet-type filtering material in an intermittently flowing fluid inside a conduit, said intermittent flow applying a force to the sheet-type filtering material and causing a movement in the sheet-type filtering material, the apparatus comprising:

(a) a gathering roll to which one end of the sheet-type filtering material is attached;

(b) a frame for stretching the sheet-type filtering material across the conduit such that the filtering material blouses; and (c) a lever arm bracket for being moved by the sheet-type filtering material, in the direction of fluid flow, and transferring the force to the gathering roll to turn the gathering roll thereby advancing the sheet-type filtering material such that clean filtering material is exposed to the fluid flow.

11. The apparatus of claim 10 wherein the lever arm bracket converts a linear movement of the sheet-type filtering material to a rotation of the lever arm bracket about an axis.

12. The apparatus of claim 11 wherein the rotation is used to advance the gathering roll.

13. The apparatus of claim 11 further comprising:

(a) means for adjustably attaching an L-arm to the lever arm bracket;

(b) a drive dog, operably, pivotally attached to the L-arm; and (c) wherein the drive dog is disposed to engage a gear operatively affixed to the gathering roll, thereby transferring force from the sheet-type filtering material to the gear, causing the gear to rotate.

14. The apparatus of claim 10 including a dispensing roll to which a second end of the sheet-type filtering material is attached.

15. The apparatus of claim 14 including a frictional means for restricting a turning of the dispensing roll.

16. The apparatus of claim 15 wherein the frictional means applies friction to an outer surface of a roll of the sheet-type filter material wound on the dispensing roll.

17. The apparatus of claim 13 wherein the means for adjustably attaching an L-arm to the lever arm bracket is a threaded fastener.

18. An apparatus for renewing a sheet-type filtering material in an intermittently flowing fluid inside a conduit, the apparatus comprising:

(a) a gathering roll to which one end of the sheet-type filtering material is attached;

(b) a frame for stretching the sheet-type filtering material across the conduit such that the filtering material blouses; and (c) a lever arm bracket for sensing an extent of a movement of the sheet-type filtering material, in the direction of fluid flow;

(d) a motor to turn the gathering roll an thereby advancing the sheet-type filtering material such that clean filtering material is exposed to the fluid flow, the amount of rotation being based on the sensed extent of the movement of the lever arm bracket.

19. An apparatus for renewing a sheet-type filtering material in an intermittently flowing fluid inside a conduit, the apparatus comprising:

(a) a main frame;

(b) a gathering roll operatively rotatably attached to said frame;

(c) a sheet-type filtering material;

(d) the gathering roll having one end thereof the sheet-type filtering material operatively attached thereto;

(e) a sub-frame for stretching the sheet-type filtering material across the conduit such that the filtering material blouses; and (f) a lever arm bracket operatively pivotally attached to the frame, said lever arm bracket having the filter material in contact therewith for transferring a movement of the sheet-type filtering material, in the direction of fluid flow, to the gathering roll to turn the gathering roll thereby advancing the sheet-type filtering material such that clean filtering material is exposed to the fluid flow.

20. The apparatus of claim 19 including means operatively attached to said lever arm bracket and to said gathering roll for rotating said gathering roll in one direction thereof in response to pivoting of said lever arm bracket.

* * * * *